United States Patent
Middleton et al.

(10) Patent No.: US 11,474,994 B2
(45) Date of Patent: Oct. 18, 2022

(54) DISTRIBUTED BLOCKCHAIN ORACLE

(71) Applicant: Intel Corporation, Santa Clara, CA (US)

(72) Inventors: Daniel Middleton, Orono, MN (US); Shawn Amundson, Minneapolis, MN (US)

(73) Assignee: Intel Corporation, Santa Clara, CA (US)

(*) Notice: Subject to any disclaimer, the term of this patent is extended or adjusted under 35 U.S.C. 154(b) by 624 days.

(21) Appl. No.: 16/234,157

(22) Filed: Dec. 27, 2018

(65) Prior Publication Data

US 2019/0129895 A1 May 2, 2019

(51) Int. Cl.
| | |
|---|---|
| *G06F 16/00* | (2019.01) |
| *G06F 16/23* | (2019.01) |
| *H04L 9/06* | (2006.01) |
| *H04L 9/32* | (2006.01) |
| *H04L 9/40* | (2022.01) |
| *H04L 67/10* | (2022.01) |
| *H04L 9/00* | (2022.01) |

(52) U.S. Cl.
CPC ........ *G06F 16/2379* (2019.01); *H04L 9/0637* (2013.01); *H04L 9/3239* (2013.01); *H04L 63/12* (2013.01); *H04L 9/50* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 2019/0050855 A1* | 2/2019 | Martino | G06Q 20/3829 |
| 2019/0363938 A1* | 11/2019 | Liebinger Portela | H04L 41/12 |
| 2020/0162264 A1* | 5/2020 | Zamani | H04L 9/3297 |

OTHER PUBLICATIONS

Wikipedia, "Blockchain", <en.wikipedia.org/wiki/Blockchain>, retrieved on Oct. 23, 2018, 16 pages.
Olson et al., "Sawtooth: An Introduction", Hyperledger, Jan. 2018, pp. 1-7.
Ongaro et al., "In Search of an Understandable Consensus Algorithm (Extended Version)", Proceedings of USENIX ATC '14: 2014 USENIX Annual Technical Conference, Jun. 19-20, 2014, pp. 1-18.
Wikipedia, "Raft (computer science)", <en.wikipedia.org/wiki/Raft_(computer_science)>, retrieved on Oct. 29, 2018, 4 pages.
Wohrer et al., "Smart Contracts: Security Patterns in the Ethereum Ecosystem and Solidity", 2018 International Workshop on Blockchain Oriented Software Engineering (IWBOSE), Mar. 20, 2018, 7 pages.
Porat et al., "Blockchain Consensus: An analysis of Proof-of-Work and its applications ", Standford University, 2017, pp. 1-6.

* cited by examiner

*Primary Examiner* — Anhtai V Tran
(74) *Attorney, Agent, or Firm* — Jordan IP Law, LLC (57) ABSTRACT

Systems, apparatuses and methods may provide for technology that determines an updated data state of a local oracle node and reconciles, in accordance with a set of consensus rules, the updated data state with one or more remote data states corresponding to a distributed network of oracle nodes to obtain a reconciled data state. The technology may also submit a transaction to a blockchain node based on the reconciled data state.

21 Claims, 5 Drawing Sheets

DISTRIBUTED BLOCKCHAIN ORACLE

TECHNICAL FIELD

Embodiments generally relate to blockchain technology. More particularly, embodiments relate to distributed blockchain oracles.

BACKGROUND

A blockchain may be a list of records (e.g., blocks) that are linked together using cryptography. For example, each record might contain a cryptographic hash (e.g., mathematical function that maps data of an arbitrary size to data of a fixed size) of the previous record, a timestamp, and transaction data. Blockchain applications may rely on external data sources termed "oracles," wherein conventional oracles typically represent single points of failure due to their centralized configuration.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
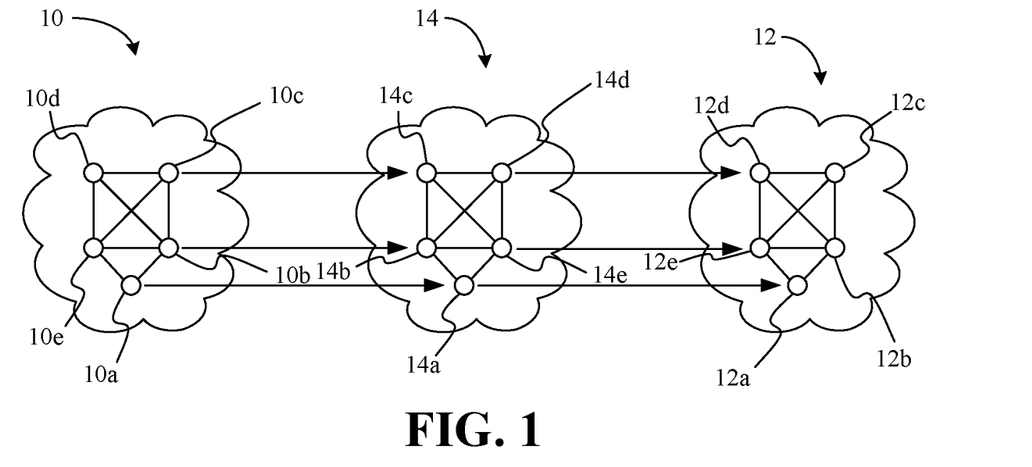
FIG. 1 is an illustration of an example of a distributed oracle according to an embodiment.

FIG. 1 shows a first blockchain network 10 (10a-10e, e.g., distributed database) that provides data to an oracle network 14 (14a-14e), which in turn serves as an external data source to a second (e.g., receiving) blockchain network 12 (12a-12e). The illustrated first blockchain network 10 includes a distributed collection of nodes that maintain a synchronized list of records (e.g., blocks), wherein the records are linked together via cryptography (e.g., each record may contain a cryptographic hash of the previous record, a timestamp, and transaction data). Similarly, the second blockchain network 12 includes a distributed collection of nodes that maintain a list of records, wherein the records are linked together via cryptography. The blockchain networks 10, 12 may be fault tolerant due to the distributed nature of the blockchain networks 10, 12.

In the illustrated example, the oracle network 14 also includes a distributed collection of nodes, wherein each oracle node reads the state of a corresponding node in the first blockchain network 10. For example, a first oracle node 14a may read the state of a first input (e.g., upstream, sending) blockchain node 10a, a second oracle node 14b may read the state of a second input blockchain node 10b, and so forth. Each oracle node may also publish the read state data by writing a transaction to a corresponding node in the second blockchain network 12. For example, the first oracle node 14a may write a first transaction to a first output (e.g., downstream, receiving) blockchain node 12a, the second oracle node 14b may write a second transaction to a second output blockchain node 12b, and so forth. In an embodiment, the transactions are the result of a deterministic (e.g., non-random) consensus procedure within the oracle network 14. As will be discussed in greater detail, the distributed nature/configuration of the oracle network 14 renders the oracle network 14 more fault tolerant (e.g., resilient) than a conventional centralized oracle. In an embodiment, the first blockchain network 10 is replaced with a data service (e.g., LIBOR/London Interbank Offered Rate service).

Figure 2:
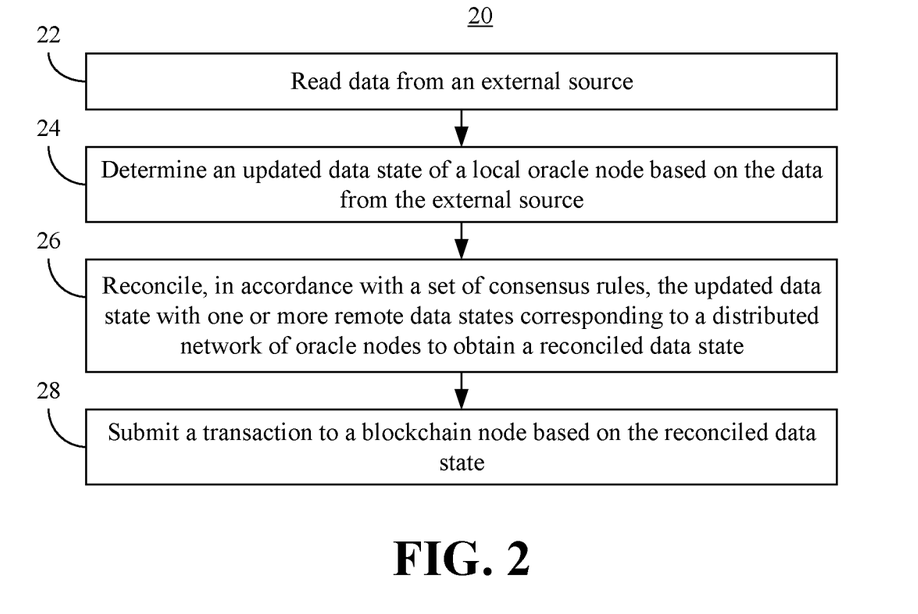
FIG. 2 is a flowchart of an example of a method of operating an oracle node according to an embodiment.

FIG. 2 shows a method 20 of operating an oracle node. The method 20 may generally be implemented in one or more of the oracle nodes of an oracle network such as, for example, the distributed oracle network 14 (FIG. 1), already discussed. More particularly, the method 20 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 20 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 22 reads data from an external source such as, for example, the first blockchain network 10 (FIG. 1) and/or a data service. The data may vary depending on the circumstances. For example, the data might indicate an interest rate (e.g., in a financial application), an identifier (e.g., in a personal identification application), a royalty distribution (e.g., in a music rights application), a package location (e.g., in a supply chain management application), a notification value (e.g., in an Internet of Things/IoT application), and so forth. Processing block 24 determines an updated data state of the local oracle node based on the data from the external source. Thus, processing block 24 might involve determining that an interest rate, identifier, royalty distribution, package location, notification value, etc., has increased or decreased by a certain amount.

In an embodiment, processing block 26 reconciles, in accordance with a set of consensus rules, the updated data state with one or more remote data states corresponding to a distributed network of oracle nodes to obtain a reconciled data state. In one example, the remote data state(s) corresponding to the distributed network of oracle nodes are also associated with the external source. Block 26 may generally include communicating with the other oracle nodes to enforce state agreement (e.g., with the nodes of the oracle network being considered a distributed state transition machine). In an embodiment, block 26 includes identifying a leader oracle node in the distributed network of oracle nodes, wherein the reconciled data state corresponds to an updated data state of the leader oracle node.

For example, the set of consensus rules might follow a Raft approach in which a node in a raft cluster is either a leader oracle node ("leader") or a follower oracle node ("follower") and can be a candidate in the case of an election (e.g., unavailable leader). The leader, which is responsible for log/record replication to the followers, can decide on the placement of new entries/records and the establishment of data flow between the leader and the other nodes without consulting other nodes. The leader may regularly inform the followers of its existence by sending a heartbeat message. In an embodiment, each follower has a timeout (e.g., typically between 150 and 300 ms) in which the heartbeat is expected from the leader. The timeout is reset on receiving the heartbeat. If no heartbeat is received, the follower changes its status to candidate and initiates a leader election.

With regard to log replication, the leader may accept client requests, where each client request includes a command to be executed by the replicated state machines in the cluster. After being appended to the leader's log as a new entry, each of the requests is forwarded to the followers as "AppendEntries" messages. For unavailable followers, the leader retries AppendEntries messages indefinitely, until the log entry is eventually stored by all of the followers. Once the leader receives confirmation from a majority of followers that the entry has been replicated, the leader applies the entry to its local state machine, and the request is considered committed. This event also commits all previous entries in the log of the leader. Once a follower learns that a log entry is committed, it applies the entry to its local state machine. Such an approach provides consistency for the logs between all the nodes through the cluster, ensuring that the safety rule of log matching is respected.

If the leader crashes, the logs can be left inconsistent, with some logs from the previous leader not being fully replicated through the cluster. In such a case, the new leader will then handle inconsistency by forcing the followers to duplicate the log of the new leader. To do so, for each of its followers, the leader will compare its log with the log from the follower, find the last entry where they agree, then delete all the entries coming after this critical entry in the follower log and replace it with its own log entries. This approach will restore log consistency in a cluster subject to failures. Other consensus rule solutions such as, for example, proof-of-work may be used, although Raft may provide more appropriate small-scale fault tolerance.

Illustrated processing block 28 submits a transaction to a blockchain node based on the reconciled data state. In an example, the blockchain node includes commit logic (a Transaction Processor handler in the case of HYPERLEDGER SAWTOOTH, a Smart Contract in the case of ETHEREUM, etc.) that verifies the transaction and commits the transaction to a locally maintained ledger replica. The transaction is expected to contain duplicate contents (e.g., relative to other transactions received from the oracle network). If each transaction is signed by the same author with the same nonce, the procedure is trivial, as blockchains typically expect and can discard duplicate transactions that are cryptographically or semantically (e.g., in the definition of the blockchain) identical. In such a case, the distributed oracle nodes republish the transaction of a leader oracle node to the receiving blockchain.

It is also possible, however, for the distributed oracle nodes to publish independent transactions signed by different authors (e.g., oracle identities) using different nonces. In such a case, the transactions will appear different even though the state transitions they propose will be identical.

A variety of blockchain commit logic is possible. Two possibilities include idempotence and voting. In the idempotence case, the blockchain network will publish all redundant transactions from the oracle nodes. Effectively, either the last transaction would be the accepted state transition and/or the blockchain will trust any individual transaction from the distributed oracle (e.g., the blockchain will not consider the possibility of a non-deterministic set of transactions for any particular state). This approach aligns with the design that republishes the transaction of the leader oracle node. In the case of voting, the blockchain network will expect at least m of n oracle transactions proposing the same state transition. This approach aligns with the design where each oracle submits an independent transaction. The illustrated method 20 therefore uses a distributed network of oracle nodes to provide a more fault tolerant solution that enhances performance, improves reliability and increases security.

Figure 3:
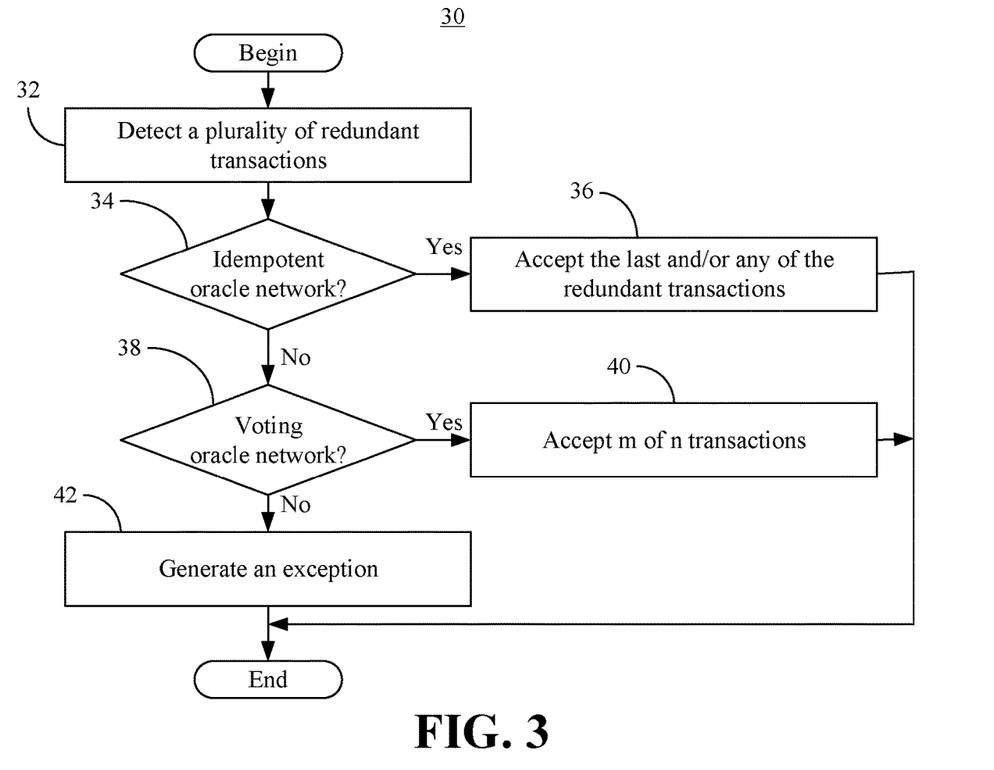
FIG. 3 is a flowchart of an example of a method of operating a blockchain according to an embodiment.

FIG. 3 shows a method 30 of operating a blockchain. The method 30 may generally be implemented in a blockchain network such as, for example, the second blockchain network 14 (FIG. 1), already discussed. More particularly, the method 30 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 32 detects a plurality of redundant transactions from a distributed oracle network. If it is determined at block 34 that the oracle network follows an idempotent policy (e.g., republishing the transaction of a leader oracle node), block 36 accepts the last and/or any of the redundant transactions and the method 30 terminates. If it is determined at block 34 that the oracle network does not follow an idempotent policy, illustrated block 38 determines whether the oracle network follows a voting policy. If so, block 40 accepts m of n transactions and the illustrated method 30 terminates. In this regard, the values of m and n may balance availability against integrity guarantees. For example, availability is increased by decreasing m, and integrity is increased by increasing m. If it is determined at block 38 that the oracle network does not follow a voting policy, illustrated block 42 generates an exception and the method 30 terminates.

Figure 4:
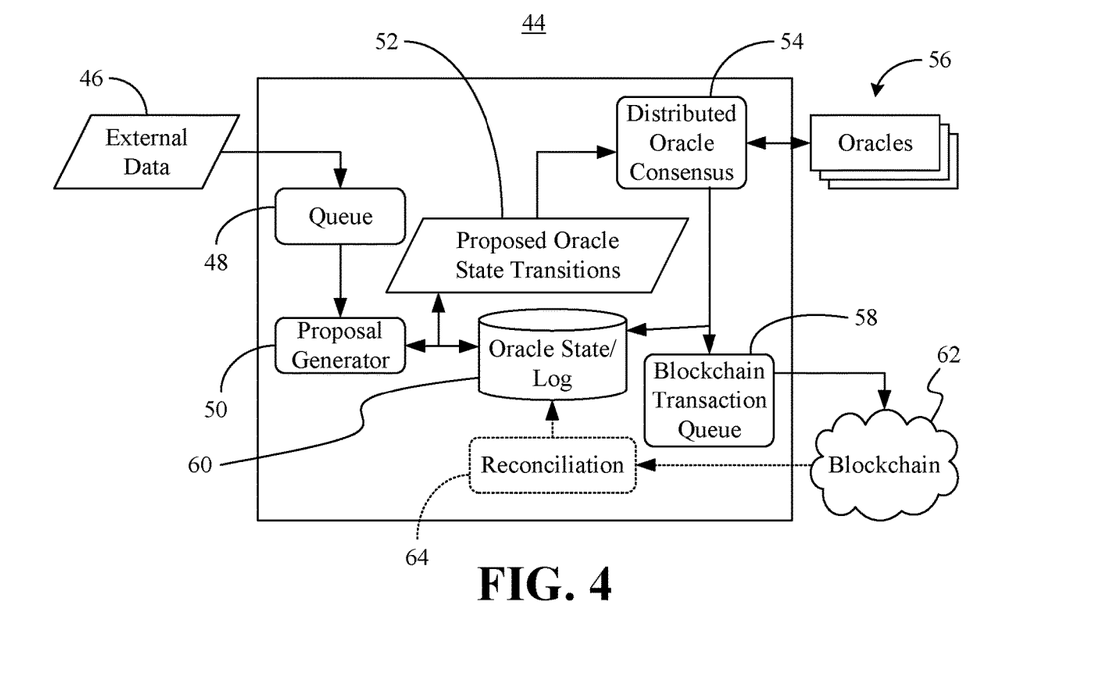
FIG. 4 is a block diagram of an example of an oracle node according to an embodiment.

FIG. 4 shows an oracle node 44, which may be readily substituted for one or more of the oracle nodes in the distributed oracle network 14 (FIG. 1), already discussed. In an embodiment, the oracle node 44 implements one or more aspects of the method 20 (FIG. 2), already discussed. In the illustrated example, external data 46 populates a queue 48, which feeds a proposal generator 50. The proposal generator 50 may provide proposed oracle state transitions 52 to a distributed oracle consensus logic 54, wherein the consensus logic 54 communicates with other nodes 56 in the distributed oracle network. The illustrated consensus logic 54 populates a blockchain transaction queue 58 based on reconciled data states and updates a log 60 that tracks both proposed state transitions and reconciled state transactions. The transactions from the transaction queue 58 are sent to a blockchain network 62.

In one embodiment, the oracle node 44 includes a reconciliation component 64 to update the log 60 with the results of the commit logic in the blockchain network 62. Thus, the reconciliation component 64 enables the oracle node 44 to detect when transactions were not sent, sent but not applied, and so forth. The illustrated oracle node 44 is therefore a more fault tolerant solution that exhibits enhanced performance, improved reliability and increased security. The components of the illustrated oracle node 44 may be implemented in logic instructions, configurable logic, fixed-functionality hardware logic, etc., or any combination thereof. As will be discussed in greater detail, the oracle node 44 may alternatively be integrated with a blockchain node in the blockchain network 62.

Figure 5:
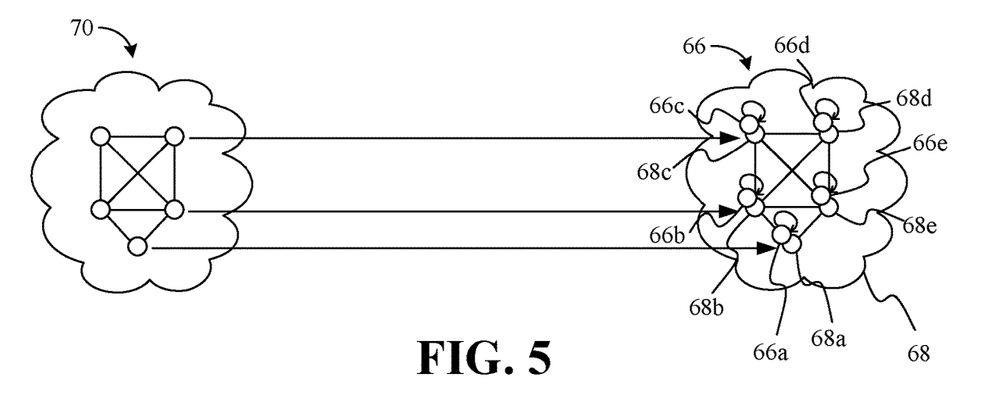
FIG. 5 is an illustration of an example of a distributed oracle according to an alternative embodiment.

FIG. 5 shows an alternative approach in which the oracle nodes of a distributed oracle overlay 66 (66a-66e) are integrated with the blockchain nodes of a receiving blockchain network 68 (68a-68e). In the illustrated example, the oracle overlay 66 receives data from an input blockchain network 70 and a separate network is not involved. Instead, each node in the receiving blockchain network 68 includes an oracle component as part of its stack. The illustrated architecture might be beneficial to, for example, a consortium that has a need for a distributed oracle but would like to avoid the added expense of operating a separate network. The illustrated architecture may also benefit from "on-chain governance," where the rules for the operation of the distributed oracle overlay 66 are defined on the receiving blockchain network 68.

Typically, nodes in a blockchain do not themselves create transactions. There are so-called "mining" cases where, for example, a bitcoin node will add a transaction that creates currency as a reward for itself. In any case, the transaction is deterministic and reproducible across the receiving blockchain network 68, and so making any external or otherwise potentially non-deterministic call would be avoided. In the illustrated solution, external data is explicitly added to the receiving blockchain network 68. To prevent non-determinism that may give rise to the use of oracles in the first place, the distributed oracle component on each node enforces consistency by participating in a consensus protocol (on oracle data) independent from the blockchain consensus (on blocks).

The oracle components act as an overlay on the receiving blockchain network 68 and operate substantially as they would above where they are a separate logical network from the blockchain network 68.

First though, the oracle component may fetch data from the data source to inform its own view. To realize the availability benefits of a distributed oracle overlay 66, the oracle component design anticipates that the data source will be periodically unavailable. No response from the data source is essentially the same problem as oracle components receiving different responses. Consensus may be used to resolve both cases. Next, following the consensus protocol in use, one node will act as a leader and inject a corresponding oracle transaction into the proposed block. This process may leverage an injection function provided by the blockchain software or may act as a fully independent client submitting a transaction no differently than any other client.

The main difference with the above is that the distributed oracle components use the same network connections as the blockchain nodes. Such an approach also has the practical benefit that in enterprise blockchain deployments it may be advantageous to minimize firewall exceptions (e.g., bypassing standard firewall constraints), reuse Transmission Control Protocol/Internet Protocol (TCP/IP) sockets, and so forth.

A second approach to consensus is possible. In this approach, no consensus is attempted before proposing the oracle transaction. Instead, each peer makes a local decision about the validity of the oracle transaction based on a local retrieval of that information. The consensus protocol in use will govern how disagreements are resolved. Because there is not a separate consensus round, this approach may be faster but also more sensitive to disagreement among the nodes. That is, disagreement on the oracle data will potentially fail an entire block.

Figure 6:
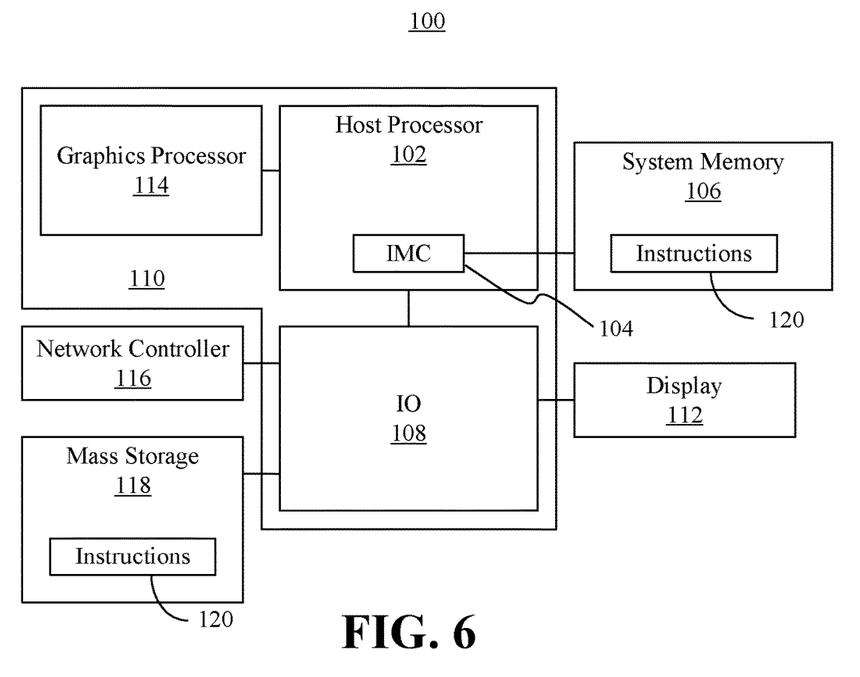
FIG. 6 is a block diagram of an example of a computing system according to an embodiment.

Turning now to FIG. 6, a resiliency-enhanced computing system 100 is shown. The system 100 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 100 includes a host processor 102 (e.g., central processing unit(s)/CPU(s)) having an integrated memory controller (IMC) 104 that is coupled to a system memory 106.

The illustrated system 100 also includes an input output (10) module 108 implemented together with the host processor 102 and a graphics processor 114 (e.g., graphics processing unit/GPU) on a semiconductor die 110 as a system on chip (SoC), wherein the IO module 108 functions as a host device and may communicate with, for example, a display 112 (e.g., touch screen, liquid crystal display/LCD, light emitting diode/LED display), a network controller 116 (e.g., wired and/or wireless), and mass storage 118 (e.g., hard disk drive/HDD, optical disk, solid state drive/SSD, flash memory). The host processor 102, the IO module 108 and/or the graphics processor 114 may execute instructions 120 retrieved from the system memory 106 and/or the mass storage 118 to perform one or more aspects of the method 20 (FIG. 2) and/or the method 30 (FIG. 3), already discussed.

Thus, execution of the instructions 120 may cause the computing system 100 to determine an updated data state of a local oracle node, reconcile, in accordance with a set of consensus rules, the updated data state with one or more remote data states corresponding to a distributed network of oracle nodes to obtain a reconciled data state, and submit a transaction to a blockchain node based on the reconciled state. The illustrated system 100 is therefore a more fault tolerant solution that exhibits enhanced performance, improved reliability and increased security.

Figure 7:
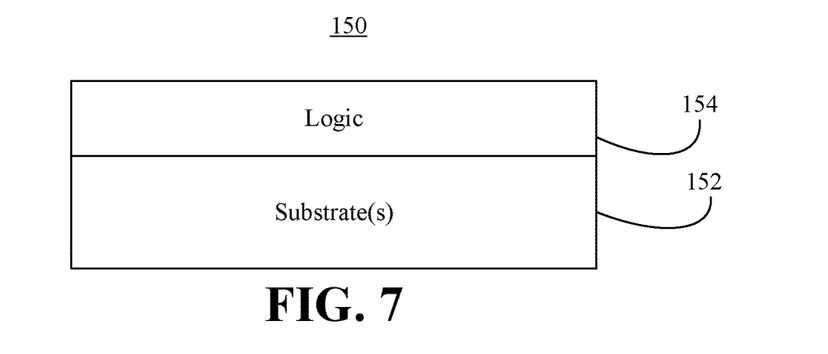
FIG. 7 is an illustration of an example of a semiconductor package according to an embodiment.

FIG. 7 shows a semiconductor package apparatus 150. The apparatus 150 may be readily substituted for the semiconductor die 110 (FIG. 6), already discussed. The illustrated apparatus 150 includes one or more substrates 152 (e.g., silicon, sapphire, gallium arsenide) and logic 154 (e.g., transistor array and other integrated circuit/IC components) coupled to the substrate(s) 152. The logic 154 may be implemented at least partly in configurable logic or fixed-functionality hardware logic. The illustrated logic 154 may generally implement one or more aspects of the method 20 (FIG. 2) and/or the method 30 (FIG. 3), already discussed. Accordingly, the logic 154 may determine an updated data state of a local oracle node, reconcile, in accordance with a set of consensus rules, the updated data state with one or more remote data states corresponding to a distributed network of oracle nodes to obtain a reconciled data state, and submit a transaction to a blockchain node based on the reconciled state. The illustrated apparatus 150 is therefore a more fault tolerant solution that exhibits enhanced performance, improved reliability and increased security.

In one example, the logic 154 includes transistor channel regions that are positioned (e.g., embedded) within the substrate(s) 152. Thus, the interface between the logic 154 and the substrate(s) 152 may not be an abrupt junction. The logic 154 may also be considered to include an epitaxial layer that is grown on an initial wafer of the substrate(s) 152.

Figure 8:
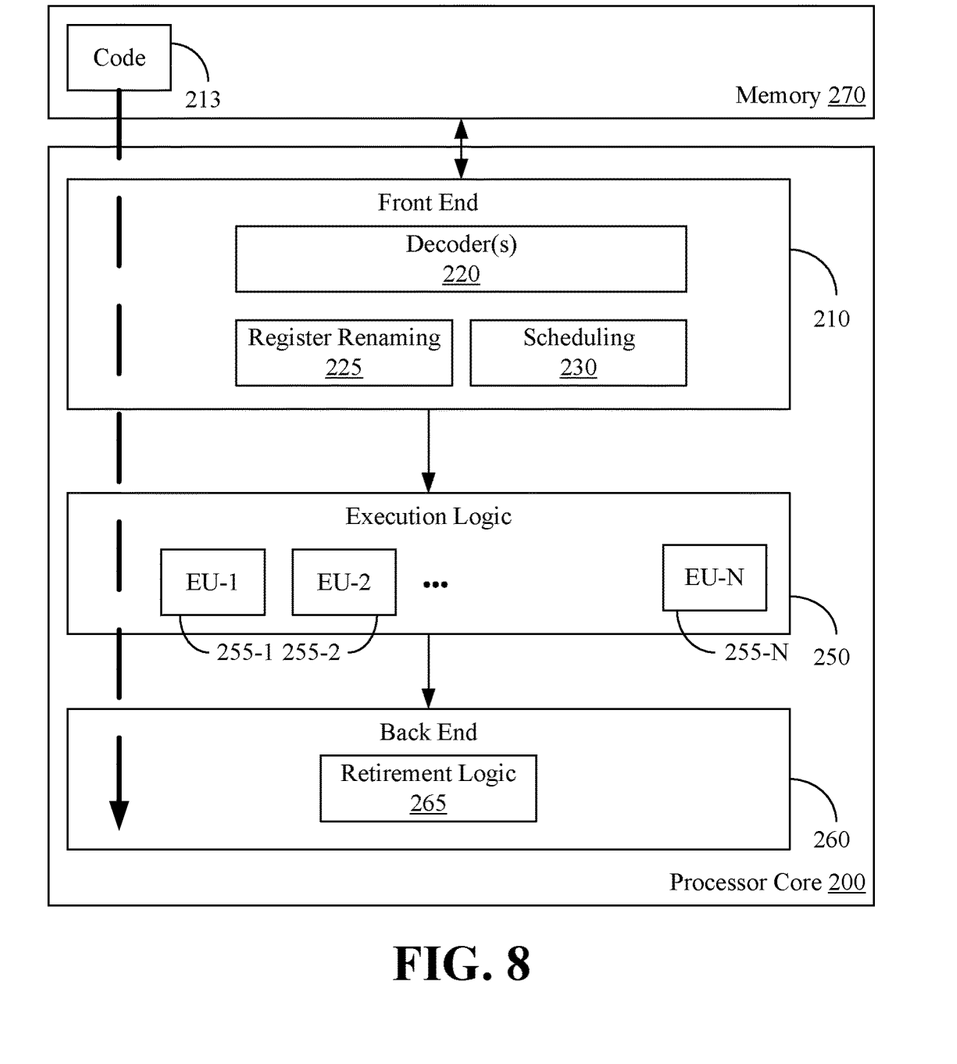
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 20 (FIG. 2) and/or the method 30 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
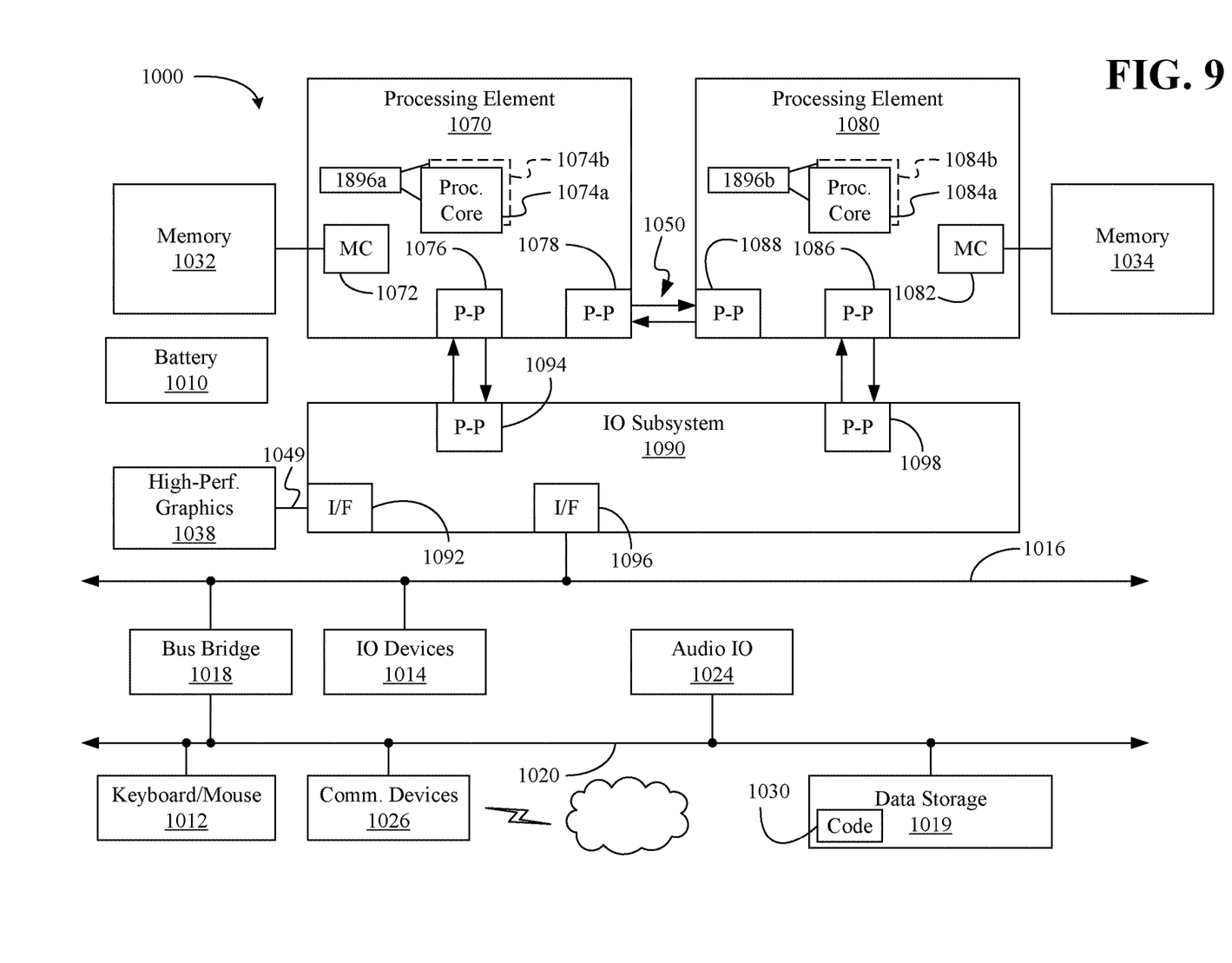
FIG. 9 is a block diagram of an example of a multi-processor based computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 20 (FIG. 2) and/or the method 30 (FIG. 3), already discussed, and may be similar to the code 213 (FIG. 8), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 includes a resiliency-enhanced computing system comprising a network controller, a processor coupled to the network controller, and a memory coupled to the processor, the memory including a set of executable program instructions, which when executed by the processor, cause the computing system to determine an updated data state of a local oracle node, reconcile, in accordance with a set of consensus rules, the updated data state with one or more remote data states corresponding to a distributed network of oracle nodes to obtain a reconciled data state, and submit a transaction to a blockchain node based on the reconciled data state.

Example 2 includes the computing system of Example 1, wherein the executable program instructions, when executed, cause the computing system to read data from an external source, wherein the updated data state of the local oracle node is determined based on the data from the external source, and wherein the one or more remote data states corresponding to the distributed network of oracle nodes are associated with the external source.

Example 3 includes the computing system of Example 1, wherein the set of consensus rules are to be independent of one or more consensus rules associated with the blockchain node.

Example 4 includes the computing system of Example 1, wherein the transaction is independent of one or more transactions associated with the distributed network of oracle nodes.

Example 5 includes the computing system of Example 1, wherein the executable program instructions, when executed, cause the computing system to identify a leader oracle node in the distributed network of oracle nodes, and wherein the reconciled data state is to correspond to an updated data state of the leader oracle node.

Example 6 includes the computing system of any one of Examples 1 to 5, further including the blockchain node, wherein the local oracle node is integrated with the blockchain node.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine an updated data state of a local oracle node, reconcile, in accordance with a set of consensus rules, the updated data state with one or more remote data states corresponding to a distributed network of oracle nodes to obtain a reconciled data state, and submit a transaction to a blockchain node based on the reconciled data state.

Example 8 includes the semiconductor apparatus of Example 7, wherein the logic coupled to the one or more substrates is to read data from an external source, wherein the updated data state of the local oracle node is determined based on the data from the external source, and wherein the one or more remote data states corresponding to the distributed network of oracle nodes are associated with the external source.

Example 9 includes the semiconductor apparatus of Example 7, wherein the set of consensus rules are to be independent of one or more consensus rules associated with the blockchain node.

Example 10 includes the semiconductor apparatus of Example 7, wherein the transaction is independent of one or more transactions associated with the distributed network of oracle nodes.

Example 11 includes the semiconductor apparatus of Example 7, wherein the logic coupled to the one or more substrates is to identify a leader oracle node in the distributed network of oracle nodes, and wherein the reconciled data state is to correspond to an updated data state of the leader oracle node.

Example 12 includes the semiconductor apparatus of any one of Examples 7 to 11, wherein the local oracle node is to be integrated with the blockchain node.

Example 13 includes the semiconductor apparatus of Example 7, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to determine an updated data state of a local oracle node, reconcile, in accordance with a set of consensus rules, the updated data state with one or more remote data states corresponding to a distributed network of oracle nodes to obtain a reconciled data state, and submit a transaction to a blockchain node based on the reconciled data state.

Example 15 includes the at least one computer readable storage medium of Example 14, wherein the executable program instructions, when executed, cause the computing system to read data from an external source, wherein the updated data state of the local oracle node is determined based on the data from the external source, and wherein the one or more remote data states corresponding to the distributed network of oracle nodes are associated with the external source.

Example 16 includes the at least one computer readable storage medium of Example 14, wherein the set of consensus rules are to be independent of one or more consensus rules associated with the blockchain node.

Example 17 includes the at least one computer readable storage medium of Example 14, wherein the transaction is independent of one or more transactions associated with the distributed network of oracle nodes.

Example 18 includes the at least one computer readable storage medium of Example 14, wherein the executable program instructions, when executed, cause the computing system to identify a leader oracle node in the distributed network of oracle nodes, and wherein the reconciled data state is to correspond to an updated data state of the leader oracle node.

Example 19 includes the at least one computer readable storage medium of any one of Examples 14 to 18, wherein the local oracle node is to be integrated with the blockchain node.

Example 20 includes a method comprising determining an updated data state of a local oracle node, reconciling, in accordance with a set of consensus rules, the updated data state with one or more remote data states corresponding to a distributed network of oracle nodes to obtain a reconciled data state, and submitting a transaction to a blockchain node based on the reconciled data state.

Example 21 includes the method of Example 20, further including reading data from an external source, wherein the updated data state of the local oracle node is determined based on the data from the external source, and wherein the one or more remote data states corresponding to the distributed network of oracle nodes are associated with the external source.

Example 22 includes the method of Example 20, wherein the set of consensus rules are independent of one or more consensus rules associated with the blockchain node.

Example 23 includes the method of Example 20, wherein the transaction is independent of one or more transactions associated with the distributed network of oracle nodes.

Example 24 includes the method of Example 20, further including identifying a leader oracle node in the distributed network of oracle nodes, wherein the reconciled data state corresponds to an updated data state of the leader oracle node.

Example 25 includes the method of any one of Examples 20 to 24, wherein the local oracle node is integrated with the blockchain node.

Example 26 includes means for performing the method of any one of Examples 20 to 25.

Thus, technology described herein may enforce data agreement in a blockchain network while providing data redundancy and network availability redundancy. The technology may therefore improve the operation of systems that rely on external data sources (e.g., interest rates for calculation of securities returns). The improvements are in terms of resiliency, fault tolerance, performance, reliability and/or security.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller;
   a processor coupled to the network controller; and
   a memory coupled to the processor, the memory including a set of executable program instructions, which when executed by the processor, cause the computing system to:
      determine an updated data state of a local oracle node,
      reconcile, in accordance with a set of consensus rules, the updated data state with one or more remote data states corresponding to a distributed network of oracle nodes to obtain a reconciled data state,
      identify a leader oracle node in the distributed network of oracle nodes, wherein the reconciled data state is to correspond to an updated data state of the leader oracle node,
      append a new entry associated with a command to a log of the leader oracle node,
      forward the new entry to a plurality of follower nodes in the distributed network of oracle nodes,
      in response to a confirmation that a majority of the plurality of follower nodes have replicated the new entry, commit the new entry to a local state machine of the leader oracle node,
      commit, with the plurality of follower nodes, the new entry to local state machines of the plurality of follower nodes in response to a determination that the leader oracle node has committed the new entry to the local state machine of the leader oracle node, and
      submit a transaction to a blockchain node based on the reconciled data state.

2. The computing system of claim 1, wherein the executable program instructions, when executed, cause the computing system to read data from an external source, wherein the updated data state of the local oracle node is determined based on the data from the external source, and wherein the one or more remote data states corresponding to the distributed network of oracle nodes are associated with the external source.

3. The computing system of claim 1, wherein the set of consensus rules are to be independent of one or more consensus rules associated with the blockchain node.

4. The computing system of claim 1, wherein the transaction is independent of one or more transactions associated with the distributed network of oracle nodes.

5. The computing system of claim 1, further including the blockchain node, wherein the local oracle node is integrated with the blockchain node.

6. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
      determine an updated data state of a local oracle node,
      reconcile, in accordance with a set of consensus rules, the updated data state with one or more remote data states corresponding to a distributed network of oracle nodes to obtain a reconciled data state,
      identify a leader oracle node in the distributed network of oracle nodes, wherein the reconciled data state is to correspond to an updated data state of the leader oracle node,
      append a new entry associated with a command to a log of the leader oracle node,
      forward the new entry to a plurality of follower nodes in the distributed network of oracle nodes,
      in response to a confirmation that a majority of the plurality of follower nodes have replicated the new entry, commit the new entry to a local state machine of the leader oracle node,
      commit, with the plurality of follower nodes, the new entry to local state machines of the plurality of follower nodes in response to a determination that the leader oracle node has committed the new entry to the local state machine of the leader oracle node, and
      submit a transaction to a blockchain node based on the reconciled data state.

7. The semiconductor apparatus of claim 6, wherein the logic coupled to the one or more substrates is to read data from an external source, wherein the updated data state of the local oracle node is determined based on the data from the external source, and wherein the one or more remote data states corresponding to the distributed network of oracle nodes are associated with the external source.

8. The semiconductor apparatus of claim 6, wherein the set of consensus rules are to be independent of one or more consensus rules associated with the blockchain node.

9. The semiconductor apparatus of claim 6, wherein the transaction is independent of one or more transactions associated with the distributed network of oracle nodes.

10. The semiconductor apparatus of claim 6, wherein the local oracle node is to be integrated with the blockchain node.

11. The semiconductor apparatus of claim 6, wherein the logic coupled to the one or more substrates includes transistor channel regions that are positioned within the one or more substrates.

12. At least one non-transitory computer readable storage medium comprising a set of executable program instructions, which when executed by a computing system, cause the computing system to:
   determine an updated data state of a local oracle node;
   reconcile, in accordance with a set of consensus rules, the updated data state with one or more remote data states corresponding to a distributed network of oracle nodes to obtain a reconciled data state;
   identify a leader oracle node in the distributed network of oracle nodes, wherein the reconciled data state is to correspond to an updated data state of the leader oracle node;
   append a new entry associated with a command to a log of the leader oracle node;
   forward the new entry to a plurality of follower nodes in the distributed network of oracle nodes;
   in response to a confirmation that a majority of the plurality of follower nodes have replicated the new entry, commit the new entry to a local state machine of the leader oracle node;
   commit, with the plurality of follower nodes, the new entry to local state machines of the plurality of follower nodes in response to a determination that the leader oracle node has committed the new entry to the local state machine of the leader oracle node; and submit a transaction to a blockchain node based on the reconciled data state.

13. The at least one computer readable storage medium of claim 12, wherein the executable program instructions, when executed, cause the computing system to read data from an external source, wherein the updated data state of the local oracle node is determined based on the data from the external source, and wherein the one or more remote data states corresponding to the distributed network of oracle nodes are associated with the external source.

14. The at least one computer readable storage medium of claim 12, wherein the set of consensus rules are to be independent of one or more consensus rules associated with the blockchain node.

15. The at least one computer readable storage medium of claim 12, wherein the transaction is independent of one or more transactions associated with the distributed network of oracle nodes.

16. The at least one computer readable storage medium of claim 12, wherein the local oracle node is to be integrated with the blockchain node.

17. A method comprising:
    determining an updated data state of a local oracle node;
    reconciling, in accordance with a set of consensus rules, the updated data state with one or more remote data states corresponding to a distributed network of oracle nodes to obtain a reconciled data state;
    identifying a leader oracle node in the distributed network of oracle nodes, wherein the reconciled data state corresponds to the updated data state of the leader oracle node;
    appending a new entry associated with a command to a log of the leader oracle node;
    forwarding the new entry to a plurality of follower nodes in the distributed network of oracle nodes;
    in response to a confirmation that a majority of the plurality of follower nodes have replicated the new entry, committing the new entry to a local state machine of a leader oracle node;
    committing, with the plurality of follower nodes, the new entry to local state machines of the plurality of follower nodes in response to a determination that the leader oracle node has committed the new entry to the local state machine of the leader oracle node; and
    submitting a transaction to a blockchain node based on the reconciled data state.

18. The method of claim 17, further including reading data from an external source, wherein the updated data state of the local oracle node is determined based on the data from the external source, and wherein the one or more remote data states corresponding to the distributed network of oracle nodes are associated with the external source.

19. The method of claim 17, wherein the set of consensus rules are independent of one or more consensus rules associated with the blockchain node.

20. The method of claim 17, wherein the transaction is independent of one or more transactions associated with the distributed network of oracle nodes.

21. The method of claim 17, wherein the local oracle node is integrated with the blockchain node.

\* \* \* \* \*